H. J. AUGUSTINE.
SPRING TIRE.
APPLICATION FILED JULY 22, 1913.

1,084,056.

Patented Jan. 13, 1914.
2 SHEETS—SHEET 1.

WITNESSES:
Harold Strauss
C. R. Ziegler.

INVENTOR
Henry J. Augustine
BY
Joshua R. H. Potts.
ATTORNEY

H. J. AUGUSTINE.
SPRING TIRE.
APPLICATION FILED JULY 22, 1913.
1,084,056.
Patented Jan. 13, 1914.
2 SHEETS—SHEET 2.
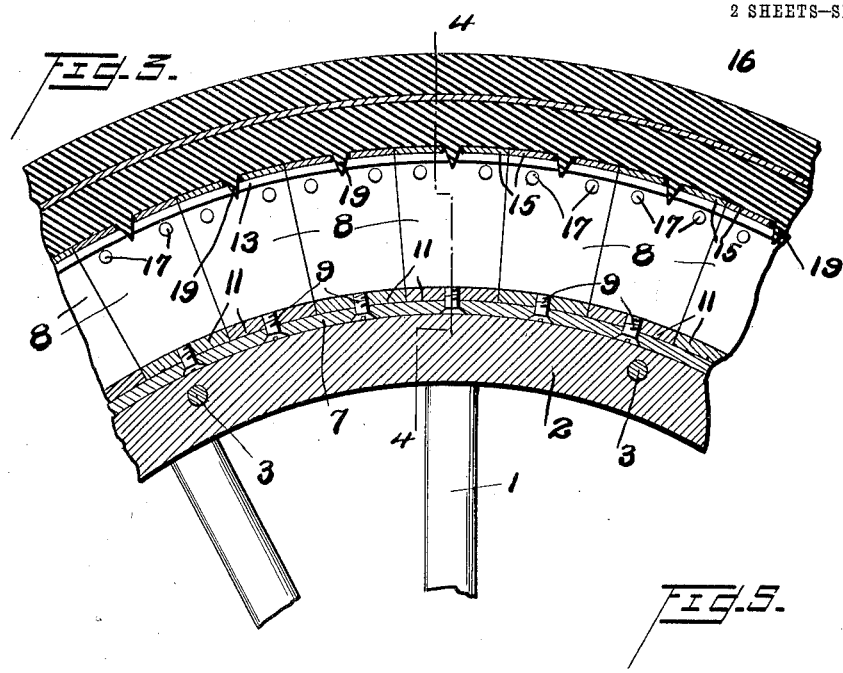
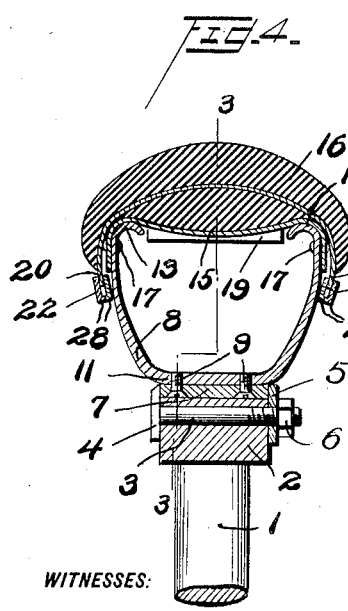
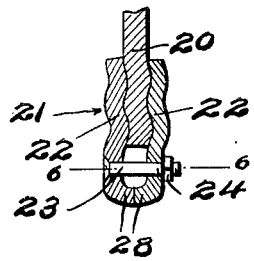
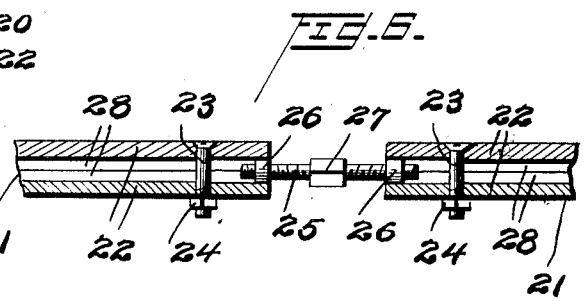
WITNESSES:
Harold Strauss
C. R. Ziegler.
INVENTOR
Henry J. Augustine
BY
Joshua R. H. Potts.
ATTORNEY

UNITED STATES PATENT OFFICE.

HENRY J. AUGUSTINE, OF INDEPENDENCE, KANSAS, ASSIGNOR OF ONE-HALF TO ROYAL S. LITCHFIELD, OF INDEPENDENCE, KANSAS.

SPRING-TIRE.

1,084,056.  Specification of Letters Patent.  Patented Jan. 13, 1914.

Application filed July 22, 1913. Serial No. 780,428.

*To all whom it may concern:*

Be it known that I, HENRY J. AUGUSTINE, a subject of the Emperor of Germany, residing at Independence, in the county of Montgomery and State of Kansas, have invented certain new and useful Improvements in Spring-Tires, of which the following is a specification.

My invention relates to improvements in spring tires, the object of the invention being to provide a spring tire which may be secured on the ordinary wheel felly, and which will resiliently support the load and cushion jars or vibrations and elastically sustain impacts from any direction.

A further object is to provide an improved construction of spring tire having a removable rubber tread portion, the latter provided with improved means for preventing its movement on the springs, and furthermore constructed so as to overlap the edges of the springs at their outer portions and protect the same from blows which the tire might receive from striking a curb or striking an object at one side of the wheel.

A further object is to provide an improved spring tire composed of a circular series of independent springs, any one of which may be removed and replaced when broken or injured.

With these and other objects in view, the invention consists in certain novel features of construction and combinations and arrangements of parts as will be more fully hereinafter described and pointed out in the claims.

Figure 1:
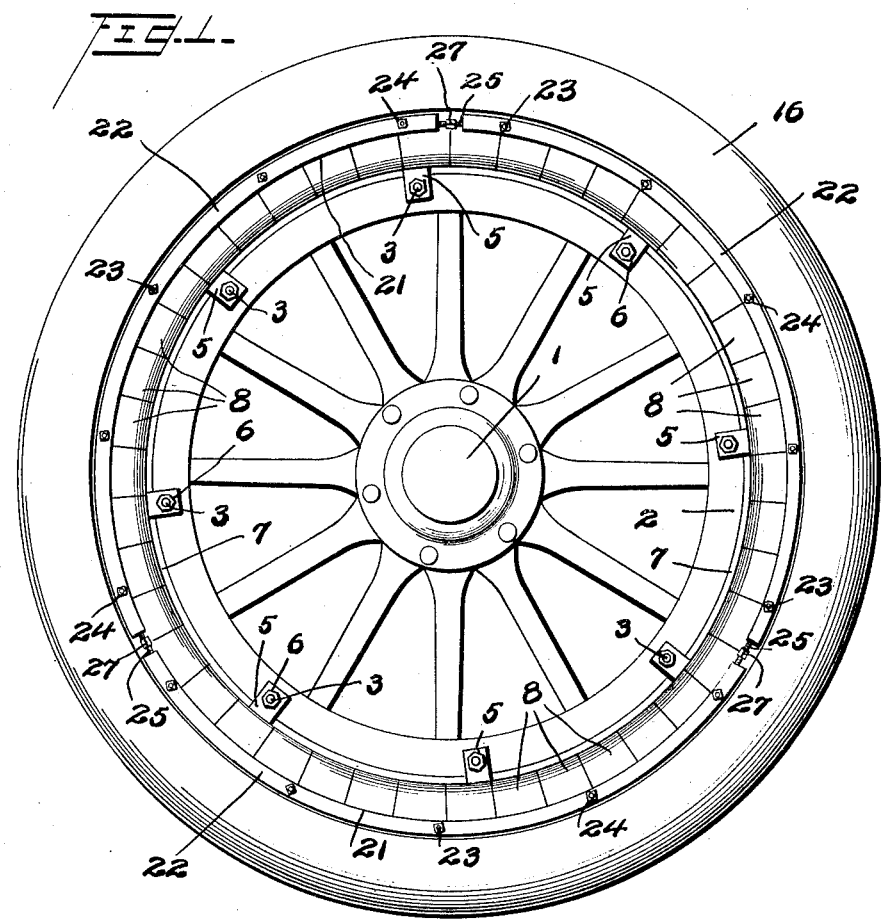
Figure 2:
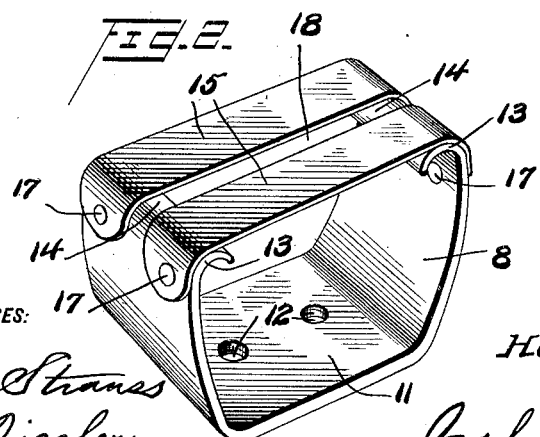

In the accompanying drawings: Figure 1 is a view in side elevation illustrating my improvements. Fig. 2 is a perspective view of one of the springs. Fig. 3 is a fragmentary view in longitudinal section on the line 3—3 of Fig. 4. Fig. 4 is a view in transverse section on the line 4—4 of Fig. 3. Fig. 5 is a fragmentary view in longitudinal section illustrating my improved adjusting means for the projecting canvas strips at the sides of the tire, and Fig. 6 is a view in section on the line 6—6 of Fig. 5.

1 represents a wheel, and 2 a felly thereon through which latter bolts 3 are projected. These bolts 3 have heads 4 at one end, and clamping plates 5 at their other ends secured by nuts 6 so as to effectually clamp a metal ring 7 around the felly.

It is to be understood that the plates 5 and nuts 6 are on the outside of the wheel, so that the tire may be readily removed and replaced. The ring 7 corresponds in width to the width of the felly and forms a part of my improved spring tire. To this ring 7, a circular series of radially positioned springs 8 are secured by bolts 9.

The springs 8 have relatively flat intermediate portions 11 which bear against the ring 7 and this flat portion is provided preferably with two screw-threaded openings 12 into which the bolts 9 are screwed to secure the springs to the ring, said bolts preferably having countersunk heads which are countersunk in the inner face of the ring 7.

The springs 8 are of general U-shape with the side portions flared outwardly and at their outer ends curved inwardly as shown at 13 so as to present an inwardly projecting curved annular bearing surface 14 against which metal straps 15 and the tread portion of the tire 16 bear, so that there can be no cutting action of this tread portion due to pressure against the ends of the springs.

The metal straps 15 are positioned over the rounded ends 14 and secured at their ends to the side portions of the springs by means of rivets 17. These metal straps 15 are positioned flush with the edges of the springs, but are of a combined width less than the width of the springs, so that a space or slot 18 is formed between them, into which integral webs 19 on the tread portion 16 of the tire project so as to prevent any possibility of the tread portion moving circumferentially around the wheel.

By reference particularly to Fig. 4, it will be observed that the tread portion at both edges overlies the outer ends of the springs 8 far enough to cover the ends of the straps 15, and said edges are of a thickness at this point sufficient to cushion any sidewise blows or jars which the wheel may receive and prevent possibility of breaking or bending the free ends of the springs at either side of the tire.

The tread portion 16 constitutes a complete ring which is of rubber and which may, in its construction, embody various combinations of materials to produce the best results.

Embedded within the tread portion 16 is a strip of canvas. This canvas is preferably positioned approximately midway between the inner and outer surfaces of the rubber tread, and at its side edges projects beyond the tread forming annular flexible extensions 20. To prevent any stretching of the tread portion and securely bind the edges of these extensions 20, I provide a circular series of curved clamps 21 as shown most clearly in Figs. 5 and 6.

Each clamp consists of two curved strips 22 having inwardly turned flanges 28 at their inner edges which engage each other. These strips 22 are positioned at opposite sides of the flexible extensions 20 and are connected by bolts 23 and nuts 24, so that when the nuts 24 are tightened on the bolts 23, the free edges of the extensions will be securely clamped.

I preferably corrugate the strips 22 so as to prevent any possibility of longitudinal movement on the canvas extensions. I preferably arrange these clamps in segments and connect the segments by adjusting screws 25.

Each clamp is provided at its ends with blocks or nuts 26 receiving the threaded ends of the adjusting screws 25. The screws are preferably oppositely threaded at their ends and have angular enlargements 27 between their ends so that they may be readily turned by an ordinary wrench.

As shown in Fig. 2, the strips 15 are straight, but when the parts are in operative position, these strips will be bowed as shown clearly in Fig. 4, and will support and strengthen the tread portion 16 regardless of the direction from which the impact comes.

It will also be noted by reference particularly to Figs. 1 and 3 that the springs 8 are given a greater circumferential dimension at their outer edges than at their inner edges, so that they will all lie side by side and give the effect of a continuous contour to the tire. If one of these springs is broken or injured, it can be removed or replaced by a new one without affecting the others, and each spring will, in turn, perform its function of giving the necessary resiliency to the tire.

It will be noted that my improved tire can be assembled in its entirety and then placed upon an ordinary wheel felly. The rubber or cushioning tread portion will absorb minor shocks and jars, while greater shocks and jars will be absorbed by the springs. By reason of the construction set forth, the tread portion cannot move in any direction and can be tightly clamped in position around the springs.

My improved tire is well adapted for use on vehicles used in time of warfare, as one spring if broken can be readily replaced. Furthermore, the close proximity of the springs prevents the entrance of dust and dirt into the tire and gives a smooth surfaced appearance to the wheel.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A spring tire comprising a ring, a circular series of radially positioned springs secured intermediate their ends to said ring and at their ends projecting outwardly from the ring and then curving inwardly forming parallel curved annular shoulders, metal strips secured at their ends to the side portions of the springs and projecting over said curved shoulders, said strips having their outer edges in line with the outer edges of their springs, and of a combined width less than the width of the springs, whereby an opening is formed between the strips, and an annular tread portion secured around said annular series of springs and having web portions projecting through the spaces formed between the strips, substantially as described.

2. A spring tire comprising a ring, a circular series of radially positioned springs secured intermediate their ends to said ring, and at their ends projecting outwardly from the ring and then curving inwardly forming parallel curved annular shoulders, metal strips secured at their ends to the side portions of the springs and projecting over said curved shoulders, and an annular tread portion secured around said annular series of springs and having interlocking engagement with the strips, substantially as described.

In testimony whereof I have signed my name to this specification in the presence of two subscribing witnesses.

HENRY J. AUGUSTINE.

Witnesses:
  M. E. DITTUS,
  C. E. POTTS.

Copies of this patent may be obtained for five cents each, by addressing the "Commissioner of Patents, Washington, D. C."